F. M. WHITE.
SHOCK ABSORBER.
APPLICATION FILED FEB. 24, 1920.
1,358,666.  Patented Nov. 9, 1920.
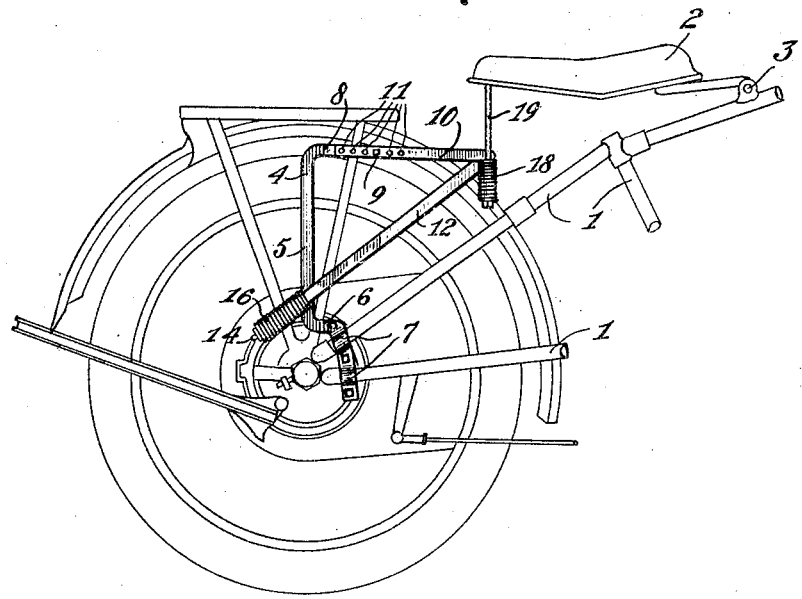
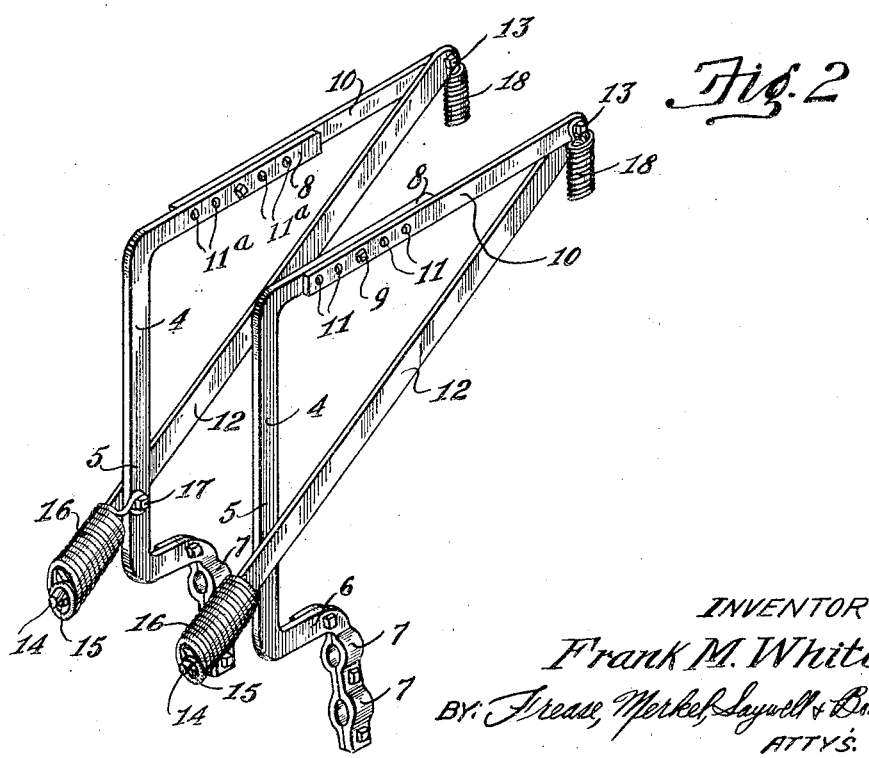
INVENTOR
Frank M. White
ATTYS.

UNITED STATES PATENT OFFICE.

FRANK M. WHITE, OF CANTON, OHIO.

SHOCK-ABSORBER.

1,358,666.  Specification of Letters Patent.  Patented Nov. 9, 1920.

Application filed February 24, 1920. Serial No. 360,692.

*To all whom it may concern:*

Be it known that I, FRANK M. WHITE, a citizen of the United States, residing at Canton, in the county of Stark and State of Ohio, have invented a new and useful Shock-Absorber, of which the following is a specification.

This invention relates to shock absorbers for self-propelled vehicles and is more especially adapted for use upon motorcycles.

The objects of the invention are to provide a shock absorber upon a motorcycle by means of which the saddle is so mounted that there may be the maximum amount of vertical resiliency, also permitting of a rocking movement of that portion of the frame to which the saddle springs are connected, thus reducing the amount of jar upon the rider and relieving the excessive wear upon the saddle springs.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a fragmentary elevation of a portion of the frame and rear wheel of a motorcycle equipped with the shock absorber to which this invention pertains; and Fig. 2 is a detail perspective view of the shock absorber.

A practical embodiment of the invention is disclosed in the accompanying drawings, forming a part of this specification in which similar numerals of reference indicate corresponding parts throughout the several views.

In the drawings the numeral 1 indicates generally the frame of a motorcycle of usual and well known construction and the numeral 2 the saddle which is pivotally connected at 3 to the frame in the usual manner.

An inverted L-shaped bar 4 is fixedly mounted upon each side of the frame 1 of the motorcycle, the lower end of the vertical arm 5 thereof being provided with an offset portion 6 provided with the clamping portion 7 by means of which the bar is rigidly connected to the frame of the motorcycle.

The upper end of each bar 4 is provided with a substantially horizontal arm 8 which is forwardly disposed and to which is pivotally attached at 9 a bar 10 provided with a plurality of apertures 11 through any one of which the bolt 9 may be passed. The horizontal arm 8 is provided with a plurality of apertures 11$^a$ through any one of which the bolt 9 may be passed, thus providing a plurality of adjustments for the bar 10. A diagonal bar 12 is pivotally connected to the forward end of each bar 10 by means of a bolt 13, the lower or rear end of each bar 12 being provided with a stud 14 which passes through the ring 15 formed upon the free end of the coil spring 16, each of these coil springs being connected by means of a bolt 17 to the lower portion of the vertical arm 5.

The usual saddle springs 18 are suspended from the bolts 13 and the rods 19 which support the saddle are extended through said springs 18 in the usual manner and connected to the lower ends thereof.

It will be seen that the improved shock absorber may be easily mounted upon any motorcycle of any usual and well known construction without the necessity of changing any parts of the motorcycle.

In the operation of the device the great vibration of running at high speed will not be transmitted to the saddle, but will to a large extent be absorbed by the shock absorber, the bars 10 rocking upon their pivots 9, causing the bars 12 to communicate the greater part of the jars to the springs 16, thus preventing or reducing the amount of jar upon the rider and at the same time relieving the saddle springs 18 from excessive wear.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. In combination with a motorcycle frame and a saddle pivotally mounted thereon, a substantially vertical bar fixedly connected at its lower end to the frame, a substantially horizontal bar pivotally mounted at one end upon the upper portion of said vertical bar, a spring mounted upon the lower portion of the vertical bar, a second bar pivotally connected at one end to the free end of the horizontal bar and connected at its other end to said spring, a saddle spring suspended from the pivotal point between said bars and means connecting the saddle to the saddle spring.

2. In combination with a motorcycle frame and a saddle pivotally mounted thereon, an inverted L-shaped bar comprising a vertical arm fixedly connected to the frame and a forwardly extending horizontal arm at the upper end of the vertical arm, a substantially horizontal bar pivotally connected to the horizontal arm, a coil spring connected to the lower portion of the vertical arm, a diagonal bar pivotally connected at its upper end to the free end of the horizontal bar, the lower end of the diagonal bar being connected to the coil spring, a saddle spring supported upon the pivotal connection between said bars and means connecting the saddle to the saddle spring.

3. In combination with a motorcycle frame and a saddle pivotally mounted thereon, an inverted L-shaped bar comprising a vertical arm fixedly connected to the frame and a forwardly extending horizontal arm at the upper end of the vertical arm provided with a plurality of apertures, a substantially horizontal bar provided with a plurality of apertures, a bolt adapted to be passed through any apertures in the bar and horizontal arm, a spring mounted upon the frame, a diagonal bar pivotally connected at one end to the free end of the horizontal bar and connected at its other end to said spring, and means connecting the saddle to the pivotal point between said bars.

In testimony that I claim the above, I have hereunto subscribed my name.

FRANK M. WHITE.